US00RE48427E

(19) United States
(12) Reissued Patent
Bruder

(10) Patent Number: US RE48,427 E
(45) Date of Reissued Patent: Feb. 9, 2021

(54) DISCHARGE DEVICE WITH INTERMEDIATE PIECE

(71) Applicant: Aptar Radolfzell GmbH, Radolfzell (DE)

(72) Inventor: Thomas Bruder, Constance (DE)

(73) Assignee: APTAR RADOLFZELL GMBH, Radolfzell (DE)

(21) Appl. No.: 16/680,018

(22) Filed: Nov. 11, 2019

Related U.S. Patent Documents

Reissue of:
(64) Patent No.: 10,086,394
Issued: Oct. 2, 2018
Appl. No.: 15/316,730
PCT Filed: Jun. 15, 2015
PCT No.: PCT/EP2015/063374
§ 371 (c)(1),
(2) Date: Dec. 6, 2016
PCT Pub. No.: WO2016/005148
PCT Pub. Date: Jan. 14, 2016

(30) Foreign Application Priority Data

Jul. 10, 2014 (DE) ..... 10 2014 213 469

(51) Int. Cl.
*B05B 11/00* (2006.01)
*A45D 40/00* (2006.01)

(52) U.S. Cl.
CPC ..... *B05B 11/3084* (2013.01); *A45D 40/0075* (2013.01); *B05B 11/3001* (2013.01); *B05B 11/3097* (2013.01)

(58) Field of Classification Search
CPC ..... B05B 11/3081; B05B 11/3084; B05B 11/3097
(Continued)

(56) References Cited

U.S. PATENT DOCUMENTS 5,169,029 A * 12/1992 Behar ..... B05B 11/3084 128/200.23
5,224,627 A * 7/1993 Weag ..... B05B 11/0054 222/135
(Continued)

FOREIGN PATENT DOCUMENTS

DE 690 06 451 T2 7/1994
DE 101 10 888 A1 10/2001
(Continued)

OTHER PUBLICATIONS

International Search Report issued in Application No. PCT/EP2015/063374 with English translation dated Sep. 16, 2015 (5 pages).
(Continued)

*Primary Examiner* — Russell D Stormer
(74) *Attorney, Agent, or Firm* — Flynn Thiel, P.C.

(57) ABSTRACT

A discharge device having an actuating handle, a first pump system for conveying a first medium and a second pump system for conveying a second medium. The actuating handle can be moved between an initial position and an end position. The first pump system includes a first pump chamber and a first piston arranged in a displaceable manner in the first pump chamber. The second pump system includes a second pump chamber and a second piston arranged in a displaceable manner in the second pump chamber. The first piston and the second piston can be displaced via the actuating handle in the direction of actuation, and the actuating handle and the first piston are coupled to each other such that the actuating handle and the first piston can be displaced relative to each other in a direction of actuation via a free travel.

20 Claims, 2 Drawing Sheets

(Amended)

(58) Field of Classification Search
USPC ..... 222/129, 135, 136, 137, 133, 134
See application file for complete search history.

(56) References Cited

U.S. PATENT DOCUMENTS

| | | | | |
|---|---|---|---|---|
| 5,967,372 | A * | 10/1999 | Favre | B05B 11/3084 222/137 |
| 6,036,057 | A * | 3/2000 | Poutiatine | B05B 11/0056 222/137 |
| 6,341,717 | B2 | 1/2002 | Auer | |
| 6,464,107 | B1 | 10/2002 | Brugger | |
| 7,222,752 | B2 * | 5/2007 | Ponton | B05B 11/3083 222/134 |
| 7,481,334 | B2 * | 1/2009 | Arghyris | B05B 11/0072 222/137 |
| 7,726,517 | B2 | 6/2010 | Kennedy et al. | |
| 9,346,069 | B2 * | 5/2016 | Holzmann | B05B 11/3056 |
| 2001/0025860 | A1 | 10/2001 | Auer | |
| 2006/0054633 | A1 * | 3/2006 | Brugger | B05B 11/3083 222/94 |
| 2009/0001099 | A1 | 1/2009 | Kennedy et al. | |
| 2012/0298694 | A1 | 11/2012 | Holzmann | |
| 2013/0299514 | A1 * | 11/2013 | Holzmann | G01F 11/023 222/134 |
| 2015/0352578 | A1 * | 12/2015 | Burrowes | B05B 11/3001 239/304 |

FOREIGN PATENT DOCUMENTS

| | | | |
|---|---|---|---|
| DE | 20 2009 014 316 | U1 | 1/2011 |
| WO | 2010/003091 | A1 | 1/2010 |
| WO | WO 2010/003091 | A1 | 1/2010 |

OTHER PUBLICATIONS

Written Opinion of International Searching Authority issued in Application No. PCT/EP2015/063374 dated Sep. 16, 2015 (5 pages).

Search Report of German Patent Office issued in Application No. 10 2014 213 469.2 dated Feb. 10, 2015 (2 pages).

* cited by examiner

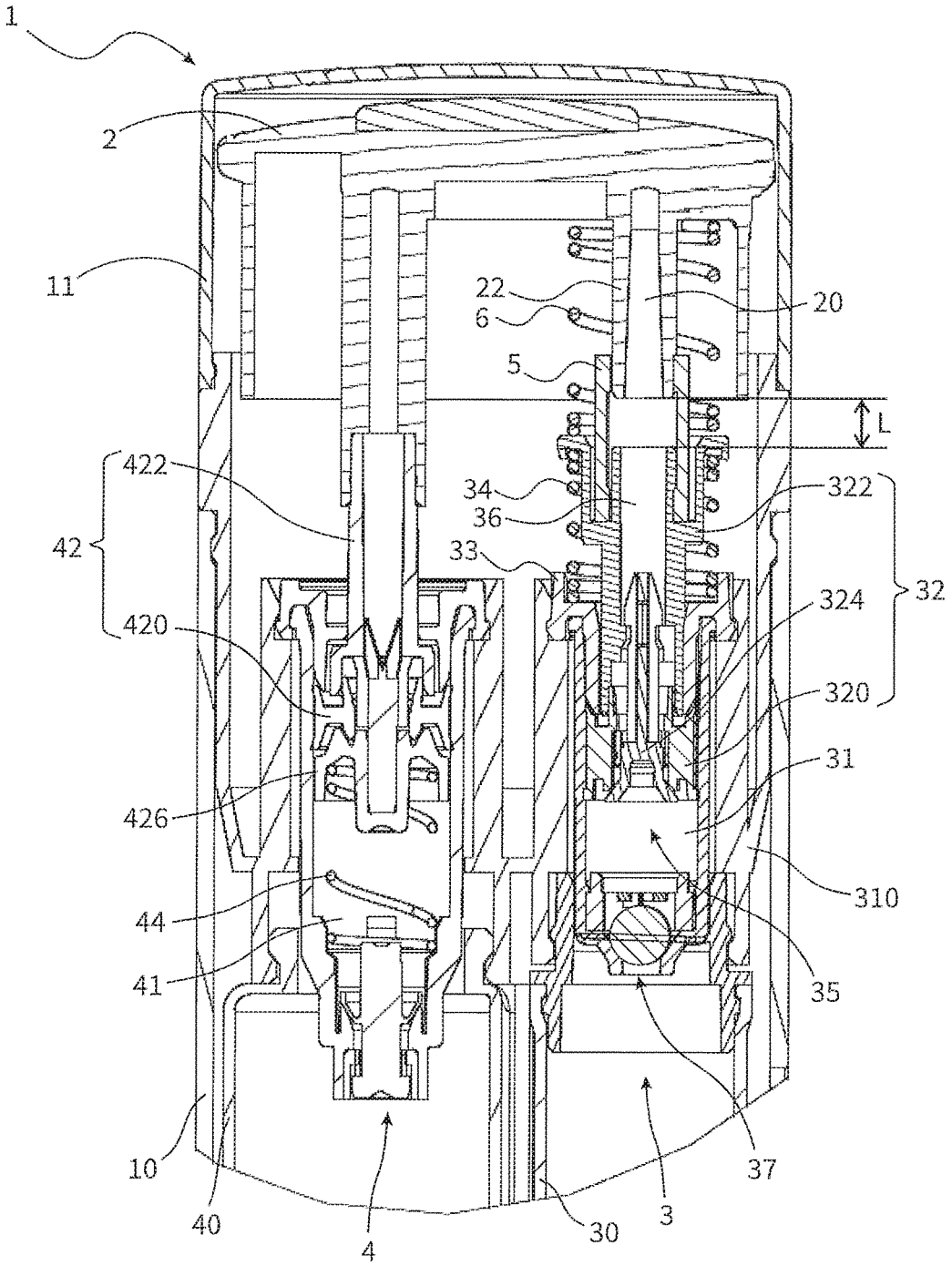
*Fig. 1*
(Amended)

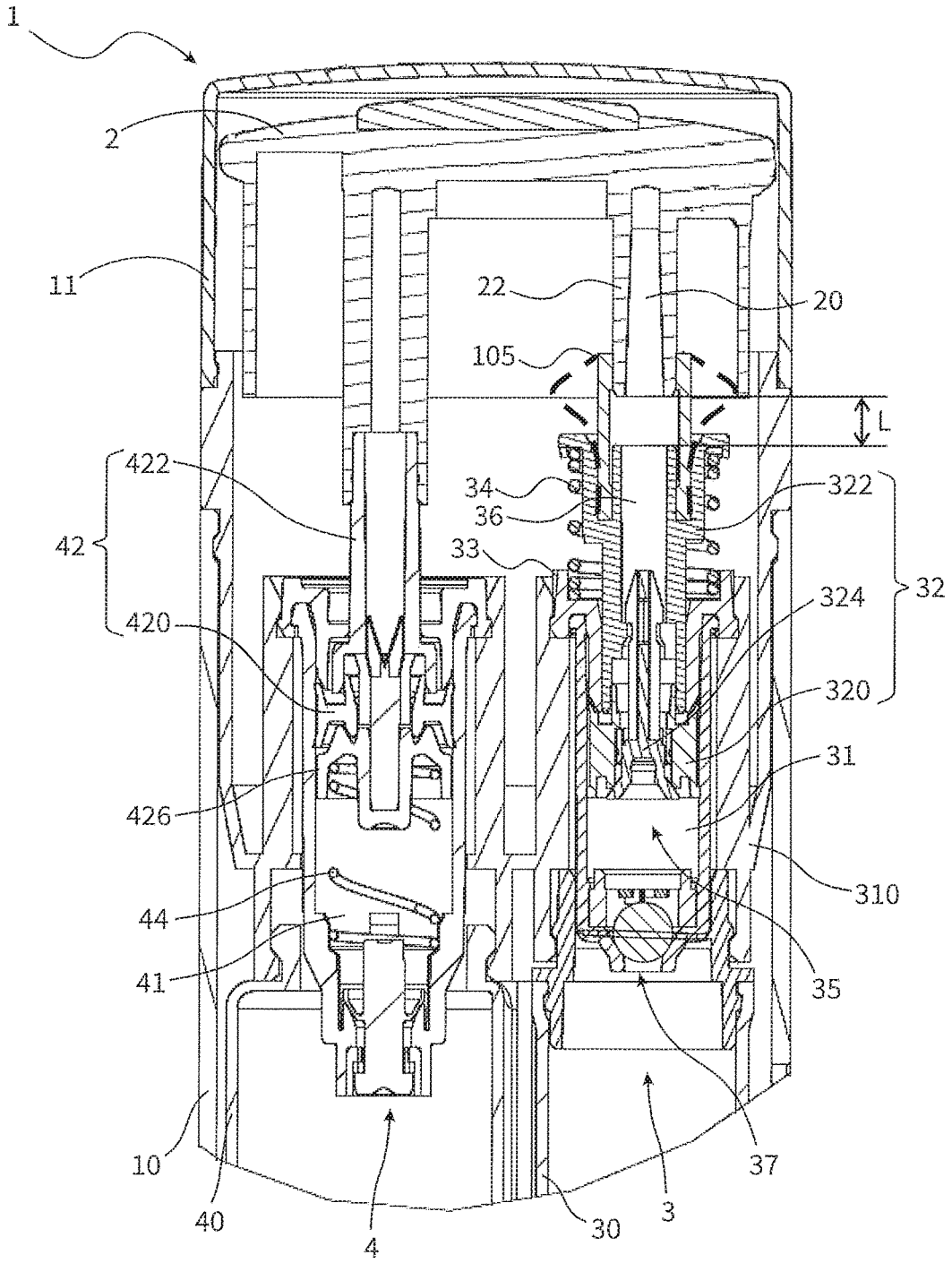
*Fig. 2*
(Amended)

DISCHARGE DEVICE WITH INTERMEDIATE PIECE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

SCOPE AND PRIOR ART

The invention relates to a discharge device having an actuating handle, a first pump system for conveying a first medium and a second pump system for conveying a second medium.

The first and/or second medium is, for example, a pasty medium such as viscous or cream-like liquids, suspensions and/or fluids, water-in-oil emulsions (W/O emulsions), oil-in-water emulsions (O/W emulsions), oleo gels, hydrogels or the like. In particular, in this case, these are cosmetic media such as skincare applications, lotions, hair gels, washing gels or the like.

DE 101 10 888 A1 discloses a discharge device for the simultaneous, metered discharge of liquid and/or pasty media from at least two storage units, which are arranged in a common housing and to which in each case separate pump systems are assigned. An actuating handle, which is designed as a lever, is mounted, in this case, in such a manner that it acts on a common actuating member in a center plane that is located between the pump systems such that both pump systems carry out same size metering strokes.

OBJECT AND ACHIEVEMENT

The object underlying the invention is to create an improved discharge device with two pump systems.

Pursuant to the invention a discharge device is provided having an actuating handle, a first pump system for conveying a first medium and a second pump system for conveying a second medium, wherein the actuating handle is movable between a starting position and an end position, the first pump system and the second pump system are actuatable together by means of the actuating handle, the first pump system includes a first pump chamber and a first piston which is arranged so as to be slidable in the first pump chamber, the first piston is displaceable in an actuating direction relative to the pump chamber by means of the actuating handle, the second pump system includes a second pump chamber and a second piston which is arranged so as to be slidable in the second pump chamber, the second piston is displaceable in the actuating direction relative to the second pump chamber by means of the actuating handle, the actuating handle is movable between a starting position and an end position, and the actuating handle and the first piston are coupled together in such a manner that the actuating handle and the first piston are displaceable relative to one another in the actuating direction over a first free travel, and wherein the distance between the starting position and the end position is greater than the first free travel.

In particular, in the case of cosmetic products, there is the need for these to be adapted individually to the requirements of the user, for example to certain hair or skin types. In order, nevertheless, to keep the number of products low, individualizing individual products by mixing constituent parts is desirable. In addition, mixing constituent parts immediately prior to use is advantageous in the case of constituent parts which place different demands on their storage and/or which react to one another when mixed.

A movement of the actuating handle for a discharge is effected manually and/or by means of motor-driven support.

On account of the free travel, there is no movement transmission to the piston at the start and/or end of a movement of the actuating handle between the starting position and the end position. When the actuating handle is reset in its starting position, by means of said relative movement an additional back suction effect can be achieved by means of which a volume of the remaining medium in the region of an outlet opening is minimized. As a result, the risk of the product drying and consequently of the region of the outlet opening becoming blocked is prevented or at least reduced.

In one development, it is provided that the actuating handle and the second piston are coupled together in such a manner that the actuating handle and the second piston are displaceable relative to one another in the actuating direction over a second free travel, wherein the distance between the starting position and the end position is greater than the second free travel. When the actuating handle is reset in its starting position, by means of a relative movement between the second piston and the actuating handle, an additional back suction effect can also be achieved by means of which a volume of the remaining medium in the region of an outlet opening is minimized.

In an advantageous development, the first free travel and the second free travel deviate from one another. As a result of the different free travels, it is possible, in this case, by means of one common actuating handle which is moved by an actuating stroke, to bring about different metering strokes for the pump systems and consequently to convey different metering quantities of the first and of the second medium by means of the associated pump systems. A metering stroke of the first pump system corresponds, in this case, to the actuating stroke minus the first free travel. A metering stroke of the second pump system corresponds to the actuating stroke minus the second free travel.

In a particularly preferred development, the second piston is operatively connected to the actuating handle in a play-free manner. This means that no free travel is provided between the second piston and the actuating handle. A metering stroke of the second pump system, in this case, corresponds to the actuating stroke. As a result, a medium is discharged immediately following a movement of the actuating handle. This can have an advantageous effect on the perception of the user as regards handling quality.

In an advantageous development, an intermediate piece is provided for a coupling between the first piston and the actuating handle, wherein the actuating handle and the first piston are coupled so as to be relatively movable over the first free travel by means of the intermediate piece. In one development, the intermediate piece, in this case, is produced integrally with the actuating handle or is connected to said actuating handle in an at least substantially rigid manner. In other developments, the intermediate piece is produced integrally with the piston. In advantageous developments, the intermediate piece is produced separately and is connected to the piston in an at least substantially rigid manner.

In an advantageous development, the intermediate piece is designed in a sleeve-shaped manner, wherein the actuating handle and/or the first piston is guided slidably into the intermediate piece. The component, in this case, is produced from a material with sufficient rigidity, for example from polyamide or polypropylene or from metal.

In an alternative development, the intermediate piece is reversibly deformable, wherein the actuating handle or the first piston is produced integrally with the intermediate piece and/or is coupled with said intermediate piece in a substantially play-free manner. The intermediate piece is produced, for example, as bellows from a thermoplastic material and/or from an elastically deformable material. In one development, the reversibly deformable intermediate piece is produced integrally with the actuating handle or the first piston, for example as a two-component injection molding part. A connection to the respectively other part is effected, for example, in a materially bonding manner by means of welding or bonding or in a non-positive locking manner, elastic restoring forces of the intermediate piece being utilizable. As an alternative to this, the intermediate piece is produced as a separate part and is connectable to both parts in a non-positive and/or materially bonding manner. The reversibly deformable intermediate piece allows for a relative movement of the piston and of the actuating handle by the free travel.

In advantageous developments, a first force element is provided between the first piston and a housing of the pump chamber, wherein the first piston is displaceable against a restoring force of the first force element for reducing a volume of the pump chamber. In one development, the first force element is arranged in the pump chamber. In particular, in the case of viscous media, however, it is advantageous to arrange the force element outside the pump chamber. The first pump chamber is also designated as the piston returning element.

As an alternative to this or in addition to it, in advantageous developments a second force element, by means of which the first piston and the actuating handle are held at a distance, is provided between the first piston and the actuating handle. The second force element serves, among other things, for stabilizing the movement over the free travel. A displacement of the actuating handle relative to the piston is effected against the force of the second force element. With the intermediate piece designed as an elastic component, in one development the intermediate piece also functions as the second force element.

The first and/or the second force element is/are designed, in particular, as restoring springs. Insofar as both the first and the second force elements are present, it is possible, on account of choosing the restoring forces of the force elements, to determine whether a relative movement is effected at the start of a movement of the actuating handle or at the end of the movement. Insofar as a second force element with a high restoring force is used, when the actuating handle is moved both elements are first of all moved together until the first piston reaches an end position. When the first piston reaches the end position, a further movement of the actuating handle leads to a relative movement of the actuating handle relative to the first piston over the free travel. Insofar as a second force element with a low restoring force is used, when the actuating handle is moved the actuating handle is first of all moved over the free travel relative to the first piston. When the actuating handle is adjusted over a distance that exceeds the free travel, the actuating handle and the piston are moved together for a product discharge.

In one development, the actuating handle and the first piston are coupled together in the starting position for a movement transmission and, when an end position of the piston is achieved, are uncoupled for a relative movement over the free travel. In advantageous developments, the actuating handle and the first piston are arranged spaced apart from one another in the starting position and, when the actuating handle is actuated for a discharge, move to a stop after the first free travel for a movement transmission.

BRIEF DESCRIPTION OF THE DRAWINGS

Further advantages of the invention proceed from the sub-claims and from the following description of exemplary embodiments of the invention which are shown schematically in the drawings. Uniform references are used for identical or similar components in the drawings. Features described or shown as part of one exemplary embodiment can also be used in another exemplary embodiment in order to obtain a further embodiment of the invention.

The drawings are as follows:

FIG. 1 shows part of a discharge device according to a first exemplary embodiment of the invention and FIG. 2 shows part of a discharge device according to a second exemplary embodiment of the invention.

DETAILED DESCRIPTION OF THE EXEMPLARY EMBODIMENTS

FIGS. 1 and 2 show schematic representations in each case of an exemplary embodiment of a discharge device 1 having an actuating handle 2, a first pump system 3 for conveying a first medium and a second pump system 4 for conveying a second medium. The media, in this case, are stored in a first container 30 and a second container 40. The discharge devices 1 shown each include a housing 10 which is common to both pump systems 3, 4 and a cover 11 which is common to both pump system 3, 4.

In one exemplary embodiment, the first container 30 comprises a drag piston. In one exemplary embodiment, the second container 40 communicates with the surrounding area for pressure equalization. Said development allows a delicate medium to be stored in the first container 30 without contact with the surrounding area, whereas a second medium is stored in the second container 40 without any specific protective measures. The volumes of the two containers 30, 40 deviate from one another, a volume of the second container 30 being greater than that of the first container 40. The described and/or shown development, however, is simply as an example and numerous modifications are conceivable.

The actuation of both pump systems 3, 4 is effected by means of the common actuating handle 2. One or two or more outlet openings (not shown) for the first and the second medium is or are provided on the actuating handle 2.

The first medium is conveyed out of the container 30 to the outlet opening or openings (not shown) by means of the first pump system 3. The pump system 3 shown includes a first pump chamber 31 and a first piston 32 which is arranged so as to be slidable in the first pump chamber 31.

The first piston 32 is designed with multiple parts and includes a ring element 320 which is mounted in the first pump chamber 31, an actuator 322 and a valve slide 324. The valve slide 324 is coupled in a substantially play-free manner with the actuator 322 and by way of the actuator 322 is slidable by a valve stroke relative to the ring element 320 which functions as a valve seat. A thrust bearing 33 is non-movably mounted on a housing 310 of the pump chamber 31. The thrust bearing 33 serves as a stop for the piston 32 in a shown top end position of the piston 32. A force element 34, which is designed as a restoring spring, is provided between the piston 32, more precisely between the actuator 322 of the piston 32, and the thrust bearing 33.

The piston 32 is displaceable in a known manner from the shown top end position against a restoring force of the force element 34 for a reduction in a volume of the pump chamber 31. In this case, the actuator 322 is first of all displaced with the valve slide 324 relative to the ring element 320 such that an outlet valve 35, which is formed by the valve slide 324 and the ring element, opens. When the actuator 322 is displaced over a distance that exceeds the valve stroke, the actuator 322 moves to the stop with the ring element 320 and the movement of the actuator is transmitted to the ring element 320. As a result of displacing the piston 32, a medium that is present in the pump chamber 31 is displaced such that the medium passes out of the pump chamber 31 by means of the outlet valve 35 into an outlet channel 36 provided in the piston 32. The outlet channel 36 of the piston 32 communicates with a channel 20 in the actuating handle 2, said channel 20 communicating with the outlet opening (not shown). When the piston 32 is moved back into the end position shown on account of the restoring forces of the force element 34, the actuator 322 is first of all moved with the valve slide 324 relative to the ring element 320 such that the outlet valve 35 closes. On account of a negative pressure that is created in the pump chamber 31 during the return movement, the inlet valve 37, which is designed as a ball valve, opens such that medium is conveyed out of the container 30 into the pump chamber 31 for pressure equalization.

The piston 32 is moved out of the top end position shown by means of the actuating handle 2. In this case, the actuating handle 2 is coupled in such a manner with the first piston 32 that the actuating handle 2 is displaceable over a free travel L in the actuating direction relative to the piston 32.

In the exemplary embodiment shown in FIG. 1, a rigid intermediate piece 5 is provided for this purpose, the actuating handle 2 and the first piston 32 being coupled so as to be displaceable relative to one another over the free travel L in the actuating direction by means of the intermediate piece 5.

The intermediate piece 5 shown is developed as a separate, sleeve-shaped component. A component of this type is producible in a cost-efficient manner. The intermediate piece 5 shown is coupled in an at least substantially play-free manner with the piston 32, more precisely with actuator 322 of the piston 32, by means of a latching connection. In other developments, the intermediate piece 5 is produced integrally with the first piston 32, in particular with the actuator 322. In yet another development, the intermediate piece 5 is produced integrally with the actuating handle 2 and is coupled with the piston 32 so as to be slidable by the free travel L relative to the piston 32.

In the exemplary embodiment shown, a journal 22, which comprises the channel 20 and is slidingly guided in the intermediate piece 5 which is designed as a sleeve, is provided on the actuating handle 2. In the exemplary embodiment shown, the actuating handle 2 and the first piston 32, with the actuating handle 2 in a shown starting position, are arranged spaced apart from one another. A second force element 6, by means of which the first piston 32 and the actuating handle 2 are held at a distance, is provided between the first piston 32 and the actuating handle 2. A maximum distance, in this case, is delimited by stops. The second force element 6, in this case, also serves for stabilizing a relative movement such that jamming or the like is avoided.

The restoring forces of the first force element 34 and of the second force element 6 are chosen, for example, in such a manner that when the actuating handle 2 is actuated for a discharge, the actuating handle 2 is first of all moved relative to the piston 32 into its starting position without movement transmission to the piston 32. The movement is effected against the restoring force of the second force element 6. After a movement over a distance that corresponds to the free travel L, the actuating handle 2, more precisely the journal 22, moves to the stop with the piston 32 such that when the actuating handle 2 is moved further, a movement is transmitted onto the piston 32.

Where an actuating force is omitted, the first force element 34 causes the piston 32 to move back into the shown end position of the piston 32. In addition, the actuating handle 2 is moved relative to the piston 32 on account of the restoring forces of the second force element 6. By means of said relative movement, an additional back suction effect is obtained, by means of which a medium that has remained at the outlet opening (not shown) is sucked into the channel 20 and/or the outlet channel 36. As a result, the risk of a product drying and consequently of a blockage in the region of the outlet opening is prevented or at least reduced.

FIG. 2 shows an alternative development. In contrast to the development according to FIG. 1, an at least partially reversibly deformable intermediate piece 105 is provided, in the case of said development too, the actuating handle 2 and the first piston 32 being coupled by means of the intermediate piece 105 so as to be displaceable relative to one another over the free travel L in the actuating direction. The reversibly deformable intermediate piece 105 is, for example, produced from an elastically deformable material and/or is designed as bellows.

The intermediate piece 105 shown in FIG. 2 is also designed as a separate component which is coupled with the piston 32, more precisely with the actuator 322 of the piston 32, and with the actuating handle, more precisely with the journal 22 of the actuating handle. A connection is effected in a non-positive or materially bonding manner. In other developments, the intermediate piece 105 is produced integrally, for example as a two-component injection molding part with the actuator 322 or the actuating handle 2.

In the case of the embodiment shown in FIG. 2, the elastically deformable intermediate piece 105 also assumes the function of the force element 6 according to FIG. 1. In other developments an additional force element is provided.

As mentioned, a second pump system 4 is provided in both exemplary embodiments shown in FIGS. 1 and 2. The second pump system 4 includes a second piston 42 which is guided in a second pump chamber 41. The second piston 42 is also developed with multiple parts and includes a ring element 420 which is mounted in the second pump chamber 42 and an actuator 422. The second piston 42 includes a thrust bearing 426 for a force element 44 which is arranged in the pump chamber 41.

In the exemplary embodiment shown, the piston 42, more precisely the actuator 422 of the piston 42, is coupled in at least substantially play-free manner with the actuating handle 2 such that movement is transmitted immediately from the actuating handle 2 to the piston 42.

The pump systems 3, 4 are actuated together by means of the actuating handle for a discharge. In the exemplary embodiment shown, a metering volume of the second pump system 4, however, is greater than that of the first pump system 3 such that a longer stroke is necessary for a complete discharge. In the exemplary embodiment shown, equalization is created by means of the distance between the actuating handle 2 and the piston 32, the stroke of the first piston 32 being shorter than that of the second piston 42 by a length which corresponds to the free travel L.

The invention claimed is:

1. A discharge device comprising:

an actuating handle movable a distance between a starting position and an end position, the distance between the starting position and the end position representing a total travel stroke of the actuating handle, the total travel stroke of the actuating handle having a first part and a second part which follows the first part;

a first pump system, actuable by the actuating handle, for conveying a first medium, the first pump system including a first pump chamber and a first piston slidably arranged in the first pump chamber, the first piston being displaceable relative to the first pump chamber in an actuating direction by the actuating handle, the actuating handle and the first piston being coupled together such that the actuating handle and the first piston are displaceable relative to one another in the actuating direction over a free travel distance corresponding to the first part of the total travel stroke, the total travel stroke of the actuating handle being greater than the free travel distance;

a first force element disposed between the first piston and a housing of the first pump chamber, the first piston being displaceable against a first restoring force of the first force element for reducing a volume of the pump chamber;

a second force element disposed between the first piston and the actuating handle and having a second restoring force which holds the first piston and the actuating handle at a distance from one another, the second restoring force being sufficient to permit displacement of the actuating handle and the first piston relative to one another over the free travel distance corresponding to the first part of the total travel stroke such that the first piston during the first part of the total travel stroke is not displaced relative to the first pump chamber and medium in the first pump chamber is not dispensed during the first part of the total travel stroke; and a second pump system, actuable by the actuating handle, for conveying a second medium, the second pump system including a second pump chamber and a second piston slidably arranged in the second pump chamber, the second piston being displaceable relative to the second pump chamber in an actuating direction by the actuating handle, the actuating handle and the second piston being coupled together such that the second piston during the first and second parts of the total travel stroke is displaced relative to the second pump chamber and medium in the second pump chamber is dispensed during the first and second parts of the total travel stroke, the actuator handle displacing the first piston relative to the first pump chamber against the first restoring force of the first force element during the second part of the total travel stroke such that medium in the first pump chamber and medium in the second pump chamber are both dispensed during the second part of the total travel stroke.

2. The discharge device according to claim 1, wherein the first restoring force of the first force element is greater than the second restoring force of the second force element.

3. The discharge device according to claim 2, wherein the second piston is operatively connected to the actuating handle in a play-free manner such that the second piston moves together with the actuating handle over an entirety of the total travel stroke thereof.

4. The discharge device according to claim 3, further including an intermediate component disposed between the first piston and the actuating handle, the intermediate component interconnecting the first piston and the actuating handle to permit relative movement therebetween during the first part of the total travel stroke of the actuating handle.

5. The discharge device according to claim 4, wherein the intermediate component is sleeve-shaped and a portion of the actuating handle [or a portion of the first piston] is slidably disposed and guided within the intermediate component.

6. The discharge device according to claim 4, wherein the intermediate component is reversibly-deformable[, and the actuating handle or the first piston is formed integrally with the intermediate component].

[7. The discharge device according to claim 4, wherein the intermediate component is reversibly-deformable, and the actuating handle or the first piston is coupled with the intermediate component in a substantially play-free manner.]

8. The discharge device according to claim 1, wherein the actuating handle and the first piston are disposed in a spaced-apart manner relative to one another when the actuating handle is in the starting position, and when the actuating handle reaches an end of the first part of the total travel stroke and begins the second part of the total travel stroke, the actuating handle and the first piston move together to cause a displacement of the first piston relative to the first pump chamber such that medium in the first pump chamber is dispensed during the second part of the total travel stroke.

9. A discharge device comprising:

an actuating handle movable a distance between a starting position and an end position, the distance between the starting position and the end position representing a total discharge travel stroke of the actuating handle, the total discharge travel stroke of the actuating handle having a first part and a second part which follows the first part;

a first pump system for conveying a first medium, the first pump system including a first pump chamber and a first piston slidably disposed in the first pump chamber, the first piston being displaceable relative to the first pump chamber by the actuating handle, the actuating handle and the first piston being coupled together such that the actuating handle and the first piston are displaceable relative to one another over a free travel distance corresponding to the first part of the total discharge travel stroke, the total discharge travel stroke of the actuating handle being greater than the free travel distance;

a first force element disposed between the first piston and a housing of the first pump chamber, the first piston being displaceable against a first biasing force of the first force element for reducing a volume of the first pump chamber;

a second force element disposed between the first piston and the actuating handle and having a second biasing force which biases the first piston and the actuating handle away from one another such that the actuating handle and the first piston are spaced apart from one another when the actuating handle is in the starting position, the second biasing force permitting displacement of the actuating handle and the first piston relative to one another over the free travel distance corresponding to the first part of the total discharge travel stroke; and a second pump system for conveying a second medium, the second pump system including a second pump chamber and a second piston slidably disposed in the second pump chamber, the second piston being displaceable relative to the second pump chamber by the actuating handle, the actuating handle and the second piston being coupled together such that the second piston is displaced relative to the second pump chamber to dispense medium in the second pump chamber during an entirety of the total discharge travel stroke; and the second biasing force of the second force element is less than the first biasing force of the first force element such that the first piston, during the first part of the total discharge travel stroke, is not displaced relative to the first pump chamber and medium in the first pump chamber is not dispensed and such that the first piston, during the second part of the total discharge travel stroke, is displaced relative to the first pump chamber and medium in the first pump chamber is dispensed only during the second part of the total discharge travel stroke.

10. The discharge device according to claim 9, wherein the actuating handle and the first piston are displaced relative to one another in opposition to the second biasing force of the second force element when the actuating handle is initially actuated and moves from the starting position and through the first part of the total discharge travel stroke, and when the actuating handle reaches an end of the first part of the total discharge travel stroke and begins the second part thereof, the actuating handle and the first piston move together in opposition to the first biasing force of the first force element to cause a displacement of the first piston relative to the first pump chamber such that medium in the first pump chamber is dispensed during the second part of the total discharge travel stroke.

11. The discharge device according to claim 10, wherein the actuating handle and the second piston are coupled to one another such that a metering stroke of the second pump system corresponds to the total discharge travel stroke of the actuating handle.

12. The discharge device according to claim 11, wherein a metering stroke of the first pump system corresponds to the second part of the total discharge travel stroke.

13. The discharge device according to claim 12, further including an intermediate component interconnecting the actuating handle and the first piston in a relatively movable manner to permit displacement of the actuating handle and the first piston relative to one another during the first part of the total discharge travel stroke, the actuating handle being disposed to displace the first piston during the second part of the total discharge travel stroke.

14. The discharge device according to claim 13, wherein the intermediate component comprises a sleeve and [one of] the actuating handle [or the first piston] is slidably disposed in the sleeve.

*15. A discharge device comprising:*

*an actuating handle, a first pump system for conveying a first medium and a second pump system for conveying a second medium, wherein the actuating handle is movable between a starting position and an end position, and wherein the first pump system and the second pump system are actuatable together by the actuating handle;*

*the first pump system includes a first pump chamber and a first piston which is slidably arranged in the first pump chamber, wherein the first piston is displaceable in an actuating direction by the actuating handle relative to the first pump chamber;*

*the second pump system includes a second pump chamber and a second piston which is slidably arranged in the second pump chamber, wherein the second piston is displaceable in an actuating direction by the actuating handle relative to the second pump chamber;*

*the actuating handle and the first piston are coupled together in such a manner that the actuating handle and the first piston are displaceable relative to one another in the actuating direction over a first free travel, wherein the distance between the starting position and the end position is greater than the first free travel, such that there is no movement transmission to the first piston at the start of a movement of the actuating handle between the starting position and the end position;*

*an intermediate piece between the first piston and the actuating handle, wherein the actuating handle and the first piston are coupled so as to be relatively movable over the first free travel by the intermediate piece; and*

*the intermediate piece comprises a sleeve, wherein at least a portion of the actuating handle is guided slidably in the intermediate piece;*

*a first piston force element, the first piston being displaceable against a first piston force of the first piston force element for reducing a volume of the pump chamber; and*

*a restoring force element having a restoring force, the restoring force being sufficient to permit displacement of the actuating handle and the first piston relative to one another over the free travel distance such that the first piston during a first part of the total travel stroke is not displaced relative to the first pump chamber and medium in the first pump chamber is not dispensed during the first part of the total travel stroke.*

*16. The discharge device according to claim 15, further including a force element disposed between the second piston and a housing of the second pump chamber, the second piston being displaceable against a restoring force of the force element for reducing a volume of the second pump chamber.*

*17. The discharge device according to claim 15, wherein:*

*the first piston force element is disposed between the first piston and a housing of the first pump chamber; and*

*the restoring force element is disposed between the first piston and the actuating handle and has the restoring force which holds the first piston and the actuating handle at a distance from one another, the free travel distance corresponding to the first part of the total travel stroke.*

*18. The discharge device according to claim 17, further including a third force element disposed between the second piston and a housing of the second pump chamber, the second piston being displaceable against a third restoring force of the third force element for reducing a volume of the second pump chamber.*

*19. The discharge device according to claim 15, wherein the second piston is operatively connected to the actuating handle in a play-free manner such that the second piston moves together with the actuating handle over an entirety of the total travel stroke thereof.*

*20. The discharge device according to claim 15, wherein the actuating handle and the first piston are disposed in a*

*spaced-apart manner relative to one another when the actuating handle is in the starting position, and when the actuating handle reaches an end of the first part of the total travel stroke and begins the second part of the total travel stroke, the actuating handle and the first piston move together to cause a displacement of the first piston relative to the first pump chamber such that medium in the first pump chamber is dispensed during the second part of the total travel stroke.*

*21. The discharge device according to claim 15, wherein the restoring force element is disposed between the first piston and the actuating handle.*

* * * * *